United States Patent [19]

Peters et al.

[11] Patent Number: 5,726,717
[45] Date of Patent: Mar. 10, 1998

[54] METHOD AND USER INTERFACE FOR CREATING, SPECIFYING AND ADJUSTING MOTION PICTURE TRANSITIONS

[75] Inventors: Eric C. Peters, Carlisle; Joseph H. Rice, Arlington, both of Mass.

[73] Assignee: Avid Technology, Inc., Tewksbury, Mass.

[21] Appl. No.: 511,756

[22] Filed: Aug. 7, 1995

Related U.S. Application Data

[63] Continuation of Ser. No. 49,028, Apr. 16, 1993, Pat. No. 5,440,348.

[51] Int. Cl.$^6$ .......................... H04N 5/262; H04N 5/272
[52] U.S. Cl. .......................... 348/593; 348/588; 348/722
[58] Field of Search .......................... 348/593, 596, 348/588, 732, 590, 598, 599; 360/14.1; 358/311, 335; H04N 9/74, 9/76, 5/222, 5/262, 5/272

[56] References Cited

U.S. PATENT DOCUMENTS

| | | | |
|---|---|---|---|
| 4,205,346 | 5/1980 | Ross | 348/722 X |
| 4,538,188 | 8/1985 | Barker et al. | 360/14.1 |
| 4,612,569 | 9/1986 | Ichinose | 348/588 |
| 4,685,003 | 8/1987 | Westland | 360/14.1 |
| 4,698,664 | 10/1987 | Nichols et al. | 358/311 |
| 4,858,011 | 8/1989 | Jackson et al. | 348/722 X |
| 4,937,685 | 6/1990 | Barker et al. | 360/14.1 |

(List continued on next page.)

FOREIGN PATENT DOCUMENTS

| | | | |
|---|---|---|---|
| 0 113 993 | 7/1984 | European Pat. Off. | G11B 27/02 |
| 0 268 270 | 5/1988 | European Pat. Off. | G11B 27/02 |
| 0 390 048 | 10/1990 | European Pat. Off. | G11B 27/00 |
| 0 438 299 | 7/1991 | European Pat. Off. | G11B 27/034 |
| 0 473 322 | 3/1992 | European Pat. Off. | H04N 3/36 |
| 0 526 064 | 2/1993 | European Pat. Off. | G11B 27/028 |
| 9018790.7 | 3/1991 | United Kingdom | G11B 27/028 |

OTHER PUBLICATIONS

Green, J.L.; The Evolution of DVI System Software; Jan./92; pp. 53-67; Communications of the ACM.

Kreig, P.; Multimedia-Computer und die Zukunft des Film/Videoschnitts; 1991; pp. 252-258; Fernseh-und Kino-Technik.

Mackay, W.E. and Davenport, G.; Virtual Video Editing in Interactive Multimedia Applications; Jul./1989; pp. 802-810; Communications of the ACM.

Norton, M.J.; A Visual EDI System.

Pantuso, C.A., "Reducing financial aliasing in HDTV production", Better Video Images, 23rd Annual SMPTE Conference, 3-4 Feb.1989, San Francisco, CA. pp. 157-169.

Rangan, P.V. et al.; "A Window-Based Editor for Digital Video and Audio"; 1992; pp. 640-648: IEEE.

The O.L.E. Partnership; Lightworks Editor, (Advertisement).

Primary Examiner—Michael H. Lee
Assistant Examiner—John W. Miller
Attorney, Agent, or Firm—Wolf, Greenfield & Sacks, P.C.

[57] ABSTRACT

Method and apparatus for editing transitions between sequences of video frames, generally including simultaneously displaying the frames in the first and second sequences that are at the beginning of the transition, and the frames in the first and second sequences that are at the end of the transition. The position of two of the four frames may be altered in their respective sequence to redefine the transition in response to a move command. Move commands may include center positioning commands, beginning commands, and end commands. The rate of change within the transition may also correspond to a predefined film characteristic.

14 Claims, 5 Drawing Sheets

U.S. PATENT DOCUMENTS

| | | | |
|---|---|---|---|
| 4,956,725 | 9/1990 | Kozuki et al. | 360/14.3 |
| 4,964,004 | 10/1990 | Barker | 360/14.1 |
| 4,972,274 | 11/1990 | Becker et al. | 360/14.1 |
| 4,979,050 | 12/1990 | Westland et al. | 360/14.1 |
| 5,040,066 | 8/1991 | Arbeiter et al. | 348/590 |
| 5,077,610 | 12/1991 | Searby et al. | 348/593 |
| 5,109,482 | 4/1992 | Bohrman | 395/154 |
| 5,111,409 | 5/1992 | Gasper et al. | 395/152 |
| 5,126,851 | 6/1992 | Yoshimura et al. | 358/335 |
| 5,189,516 | 2/1993 | Angell et al. | 348/588 |
| 5,191,645 | 3/1993 | Carlucci et al. | 395/159 |
| 5,194,952 | 3/1993 | Pelley | 348/594 |
| 5,305,438 | 4/1994 | MacKay et al. | 395/164 |
| 5,353,391 | 10/1994 | Cohen et al. | 395/125 |
| 5,388,197 | 2/1995 | Rayner | 395/154 |
| 5,440,348 | 8/1995 | Peters et al. | 348/593 |
| 5,528,310 | 6/1996 | Peters et al. | 348/593 |

METHOD AND USER INTERFACE FOR CREATING, SPECIFYING AND ADJUSTING MOTION PICTURE TRANSITIONS

This application is a continuation of application Ser. No. 08/049,028, filed Apr. 16, 1993, now U.S. Pat. No. 5,440,348 entitled METHOD AND USER INTERFACE FOR CREATING, SPECIFYING AND ADJUSTING MOTION PICTURE TRANSITIONS and now Pending.

FIELD OF THE INVENTION

The invention relates generally to systems and methods for editing and composing motion picture material, and more particularly to operations on transitions between scenes in such material.

BACKGROUND OF THE INVENTION

In assembling individual motion picture (i.e., film or video) scenes into larger compositions, the scenes are linked together by transitions. Most transitions are simple cuts, but a significant number are other forms of gradual transitions. These include dissolves (or cross-fades), wipes, and various specialized transitions such as blends, rotations and peels.

In a dissolve, a first scene is gradually dimmed while a second scene is gradually brightened, so that the viewer sees the transition as a continuous shift from the first scene to the second scene. During all of the types of gradual transition effect, as the term is to be understood in the context of this application, the first scene and second are both visible to some extent at the same time. For example, in a wipe, part of the second scene is displayed in a portion of the first scene, and this portion is gradually made larger until the second scene occupies the entire display area.

Preparing gradual transitions using 35 mm motion picture film is generally performed by specialized laboratories. 16 mm transitions are prepared using a technique called A-B rolling, in which two prints of the film are prepared with alternating scenes and then combined to yield the gradual transitions. Both of these techniques usually require the film to be conveyed to a processing laboratory in order to generate the transition in final form.

Video editing and composition systems also allow for the creation of transitions. In these systems, it is known to specify a gradual transition by its centerpoint. By centerpoint is meant the point in time within the transition halfway between the beginning and end of the transition. The editor manipulates the transition much like a cut, but upon playback, the transition begins before the centerpoint, and ends after the centerpoint. The user may also manually generate the transition using an effects bar control, which is a control lever that often resembles a joystick. This allows the user to control the rate at which the transition takes place. These manually-generated transition profiles may also be stored.

It is also known to display a series of independent monitors with the material from the first scene above a second series of independent monitors with the material from the second scene. In the top row, each monitor shows a successive frame of the first scene, and in the bottom row, each monitor shows a corresponding successive frame of the second scene. This system may allow the user to view several frames from each scene in a transition simultaneously. The Montage Picture Processor system, available from Montage R&D Corp. of Littleton, Mass. uses this approach.

SUMMARY OF THE INVENTION

In general, the invention pertains to the editing of transitions between sequences of video frames. This includes simultaneously displaying the frames in the first and second sequences at the beginning of the transition, and the frames in the first and second sequences at the end of the transition. The position of two of the four frames may then be altered in their respective sequence to redefine the transition in response to move commands. The rate of change within the transition may also correspond to a predefined film characteristic.

The transition editing method of the invention allows for efficient, versatile and precise editing of motion picture source material. Because the first and last frames of the two scenes in the transition are both shown, it is easy for the user to see material that is not intended to be part of the transition. Such material may include booms, slates, microphones and the like. These unintended events might otherwise be hard to see, especially at the edges of the transitions where one of the scenes may be quite dim. The controls and displays of the invention are also meaningfully and efficiently laid out. The film-matching transition feature of the invention allows an editor to edit video tape using transitions that are similar to film transitions, to achieve a more film-like effect on a video copy. This enables the user to accurately preview material on the computer that is ultimately to be printed on film, without the cost and delay of laboratory work.

BRIEF DESCRIPTION OF THE DRAWINGS

For a better understanding of the present invention, together with other and further objects, advantages and capabilities thereof, reference is made to the accompanying drawings, which are incorporated herein by reference and in which.

DESCRIPTION OF THE PREFERRED EMBODIMENT

Figure 1:
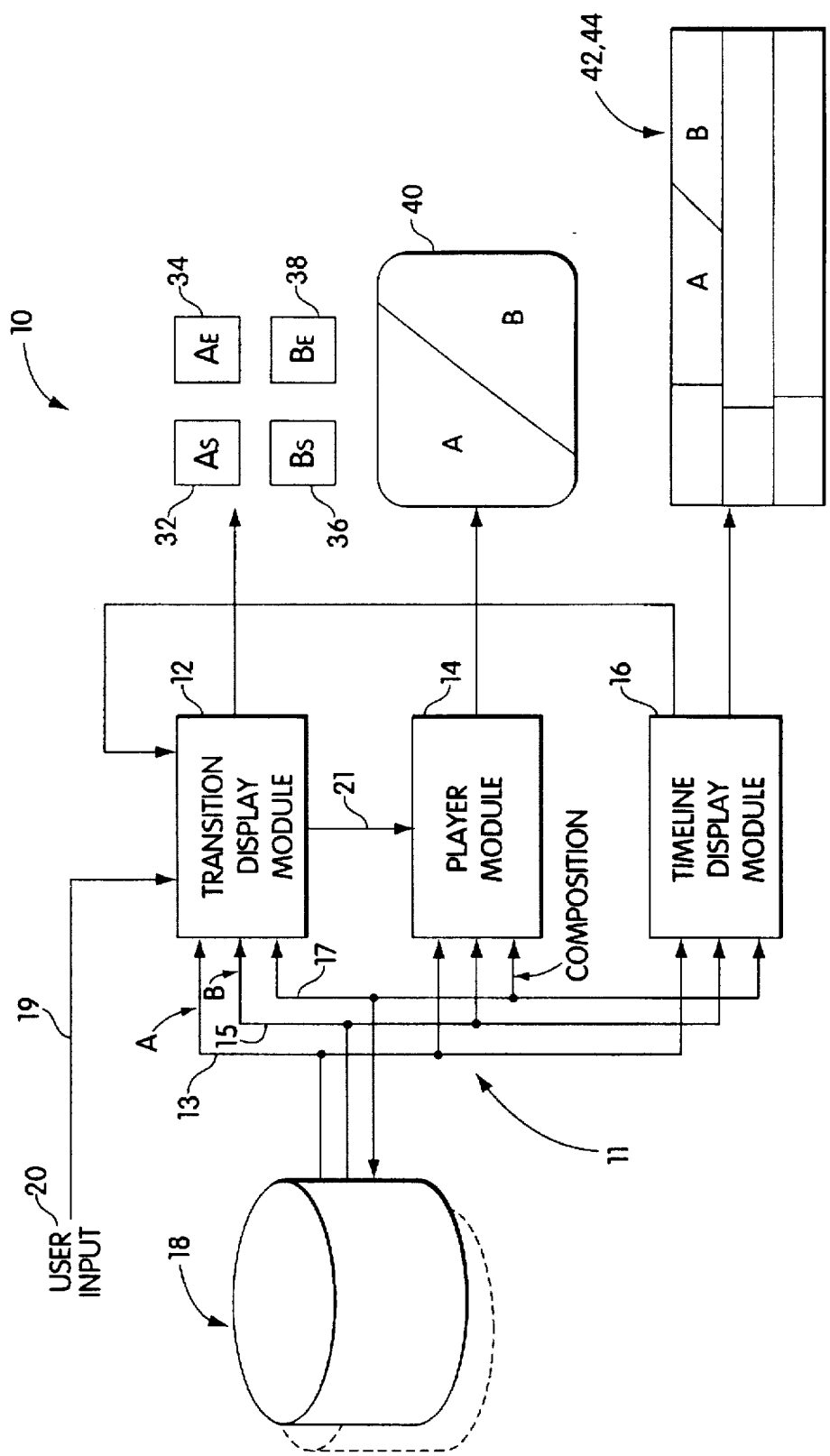
FIG. 1 is a block diagram of a motion picture composing system according to the invention.

Referring to FIG. 1, an exemplary motion picture composition system 10 according to the invention includes a transition display module 12, a player module 14, and a timeline display module 16. A data path 11 links a storage unit 18 with these modules. This data path may be broken down into several data lines 13, 15, 17. These data lines may be dedicated to different synchronized media channels, such as video, audio, and composition channels. These lines need not be separate physical lines. An input data path relays user input from a user input device 20, such as a pointing device, to the transition display module. The transition display module 12 relays transition display window information to transition display windows 32, 34, 36, 38 (see FIG. 2). The transition display module also relays transition information 21 to the player module 14, which will enable the player module to play back the entire transition on a transition playback display window 40. The timeline display module generates timeline information to be displayed on the display as a pair of timelines 42, 44. The timeline display module also provides information about user-initiated changes of transitions to the transition display module.

A system according to the invention may be developed using a variety of types of computer systems. In one embodiment, an Apple Macintosh and the "C" computer language were used, but naturally the invention should not be read to be limited to this particular platform. The transition display module 12, player module 14 and timeline display module 16 may be implemented in software and/or hardware and may or may not be contained within the computer system. A software package entitled "Avid Media Composer", available from Avid Technology, Inc. of Tewksbury, Mass. includes some of these features. The storage may include a high-speed, high-capacity internal magnetic hard disk drive. For further information on computer-based media storage and playback of video and audio information, see Peters et al., "VIDEO AND AUDIO TRANSMISSION SYSTEM AND METHOD", U.S. Pat. No. 5,045,940, issued Sep. 3, 1991, herein incorporated by reference.

Figure 2:
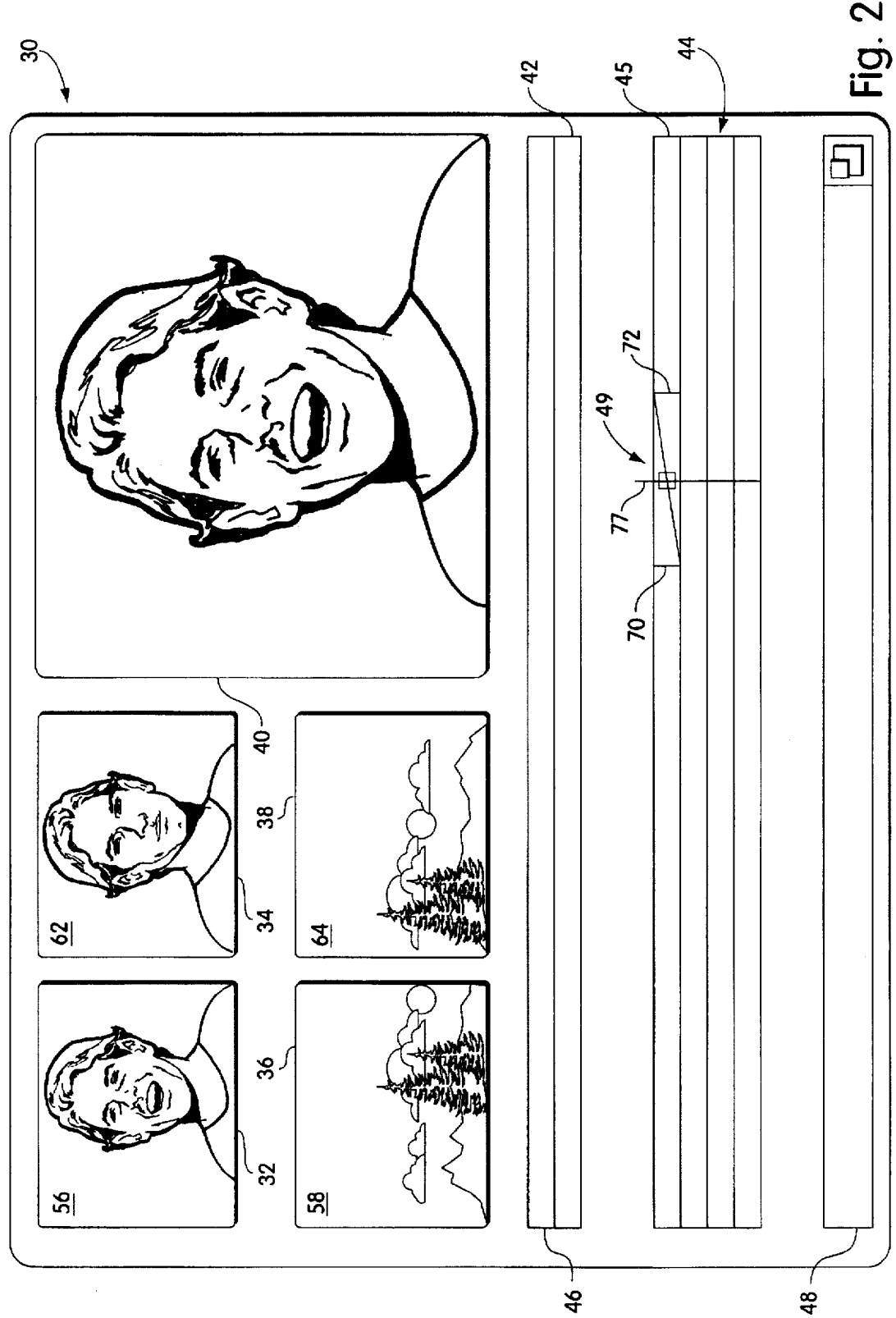
FIG. 2 is a drawing of an exemplary interface screen for the system of FIG. 1.

Referring to FIG. 2, the display interface 30 presented by the composition system to the user includes a series of four transition definition display windows 32, 34, 36, 38. The interface also includes a transition playback display window 40, a coarse timeline 42, a fine timeline 44, a command bar 46, and a mode bar 48.

Figure 3:
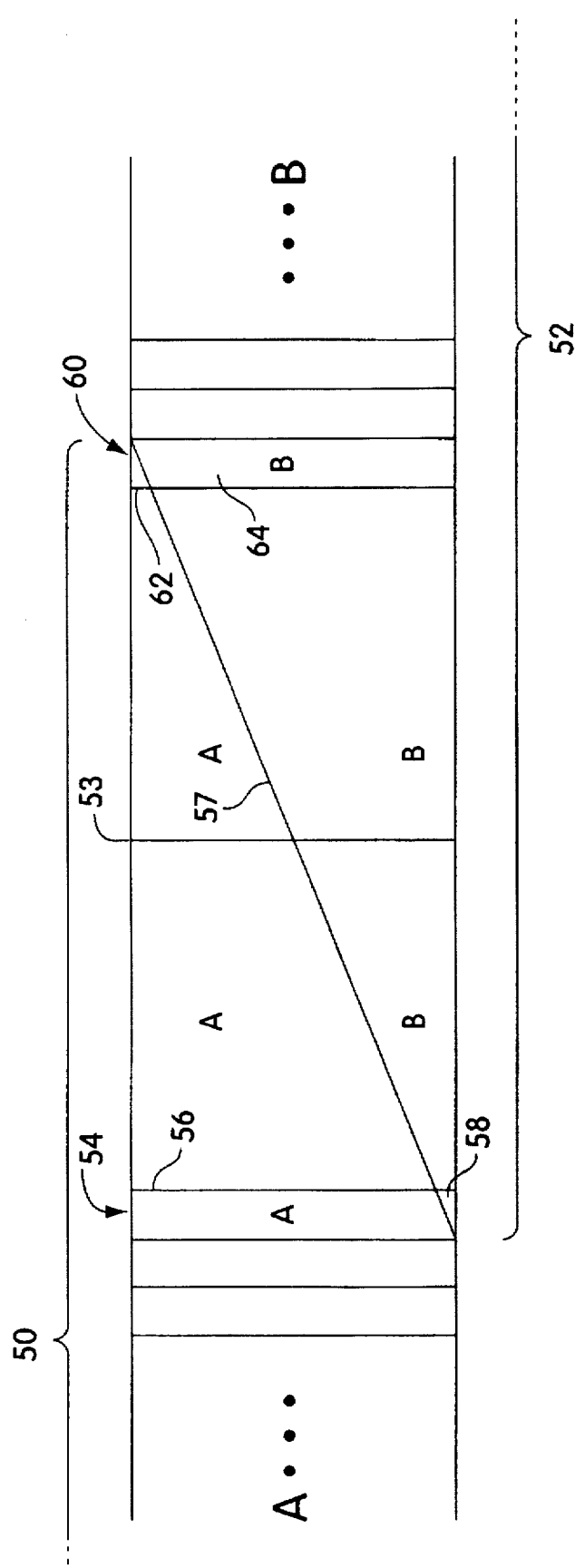
FIG. 3 is a schematic representation of a transition.

Referring to FIGS. 2 and 3, the transition between a first scene "A" 50 and a second scene "B" 52 begins where a first frame position 54 starts to include material from both of the scenes. In the case of a dissolve, this first frame position will show a frame 56 from the first scene at the same time as a frame 58 from the second scene. In this first frame position, the frame from the first scene will be displayed much more brightly than the frame from the second scene. As the dissolve continues, frames from the first scene will become dimmer as frames from the second scene become brighter. At a final frame position, a last frame 62 from the first scene will be displayed much more dimly than the corresponding frame 64 from the second scene. This type of transition is symbolized by a diagonal line 57 representing this gradual shift.

The transition definition display windows each correspond to frame positions either at the beginning 54 or the end 60 of the transition. The first window 32 of FIG. 2 displays the first frame 56 from the first scene in the transition. The second window 34 displays the last frame 62 from the first scene in the transition. The third window 36 displays the first frame 58 from the second scene in the transition. The fourth window displays the last frame 64 from the second scene in the transition.

In operation, a user of the composing system of the invention will first manipulate the coarse timeline 42 to determine the rough area in which the transition is to be added. The user may then manipulate the fine timeline 44 to define a precise position for the edit. Using a mouse or other computer input device, the user may select two scenes to be displayed and place them in a composing area 45 of the timeline. To then create a gradual transition, the user may select one of a series of transition types and drag it to a position between the two scenes on the composition track 45 of the timeline. The system thereafter displays the transition as a transition control box 49.

The user may then drag the transition start control line 70 to move the start of the transition earlier or later in time. Similarly, the user may move the end transition control line 72 to end the transition earlier or later in time. In moving the transition start line 70, the first transition display window 32 will display an earlier frame of the first scene. The third transition window 36 will also display an earlier frame of the second sequence. Moving the transition end control line 72 similarly affects the second 36 and fourth 38 transition display windows.

The user may also move the central transition position 53 of the first scene. This may be done by manipulating the central transition command line 77 on the fine timeline. When the user moves the center of the transition for the first scene in this way, the first and second transition display windows 32, 34 are updated correspondingly, but the third and fourth transition display windows do not change. This allows the user to start the transition at a different time within the first scene.

Similarly, the user may move the center control for the second scene. This may be done with the central transition command line 77 modified by a mode control. In response to this command, the third transition display window 36 and the fourth transition display window 38 will be updated, leaving the first and second transition display windows 32, 34 unchanged. This allows the user to change the point in the second scene at which the transition begins. The user may also move both transition centers at the same time, in a similar manner. The user may play the whole transition on the playback display window at any time, under control of the command bar 46.

Figure 4:
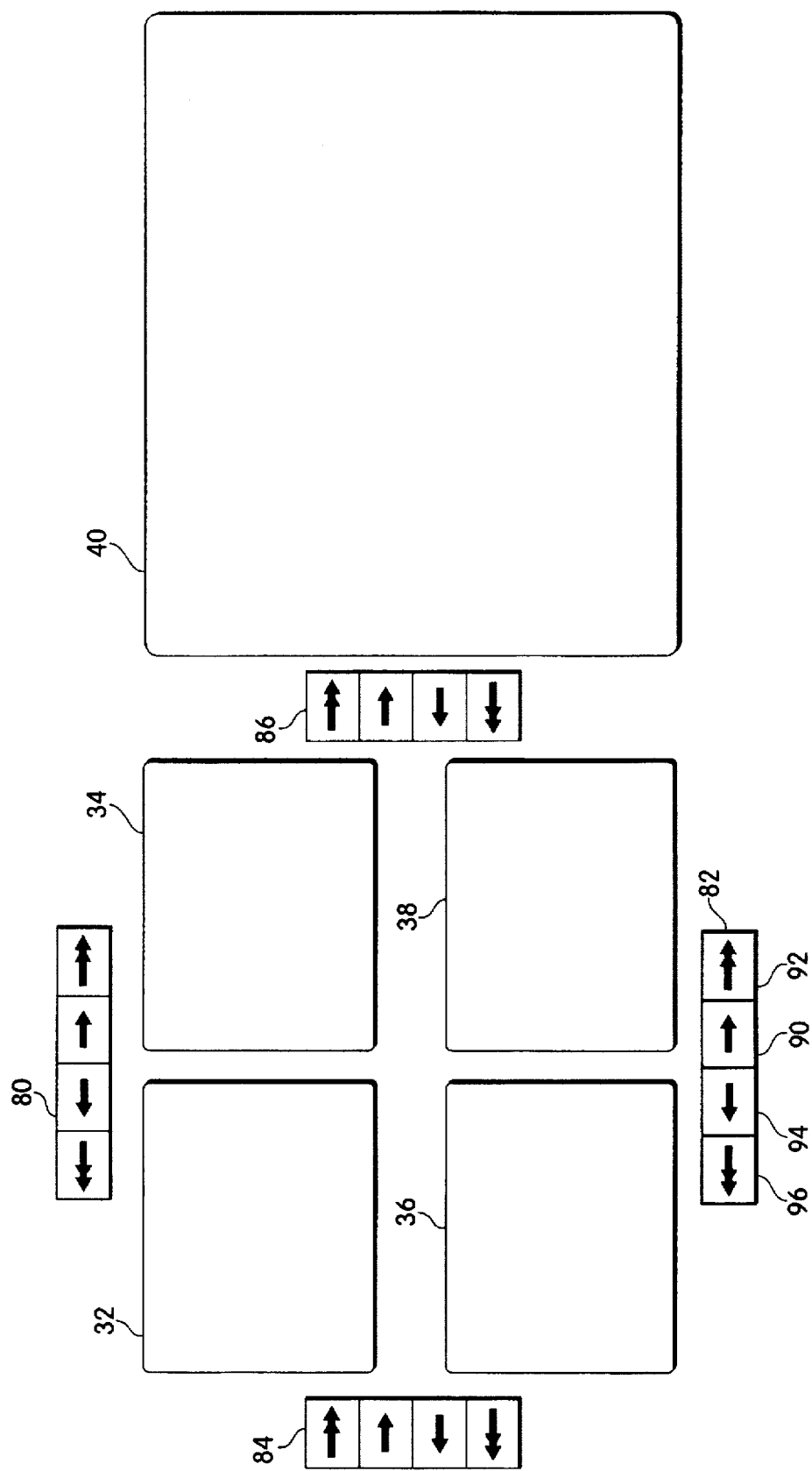
FIG. 4 is an alternative embodiment of display portions of the screen of FIG. 2.

Referring to FIG. 4, an alternative embodiment of the invention also includes four transition display windows and a playback window. In this embodiment, however, a series of four button bars 80, 82, 84, 86 are provided in a pattern surrounding the display windows. A button bar is an area of the screen containing "buttons" or control areas, which respond to user input from a pointing device.

The first button bar 80 is placed above the first and second transition display windows and centered on a line roughly between them. The second button bar 82 is placed below the third and fourth transition display windows and centered on a line roughly between them. The third button bar is placed to the left of the first and third transition display windows and centered on a line roughly between them. The fourth button bar is placed to the right of the second and fourth transition display windows and centered on a line roughly between them. This arrangement and the corresponding functionality allow for efficient editing and are easy to understand.

The button bars may each include a series of control icons or buttons. In one embodiment, each button bar includes four buttons 90, 92, 94, 96. A first 90 of these buttons is a single frame advance button, which permits the user to step through the motion picture material to be displayed one frame at a time. A second button 92 is a multiple frame advance button, which allows the user to advance through the material at a rate of approximately 0.3 seconds per actuation. Conversely, a single frame reverse button 94 and multiple frame reverse button 96 are also provided. Other controls may also be provided on the button bars, as discussed later in the present specification.

The first button bar 80 controls the centerpoint of the transition for the first scene, and the second button bar 82 controls the centerpoint of the transition for the second scene. The third button bar 84 controls the start of the transition for both scenes, and the fourth button bar 86 controls the end of the transition for both scenes. By clicking on the button bars, the user may therefore quickly adjust the parameters of the transition.

Other control arrangements are possible. For example, one button bar might be provided for each of the transition display windows, allowing the user to manipulate the position of each frame position individually.

Figure 5:
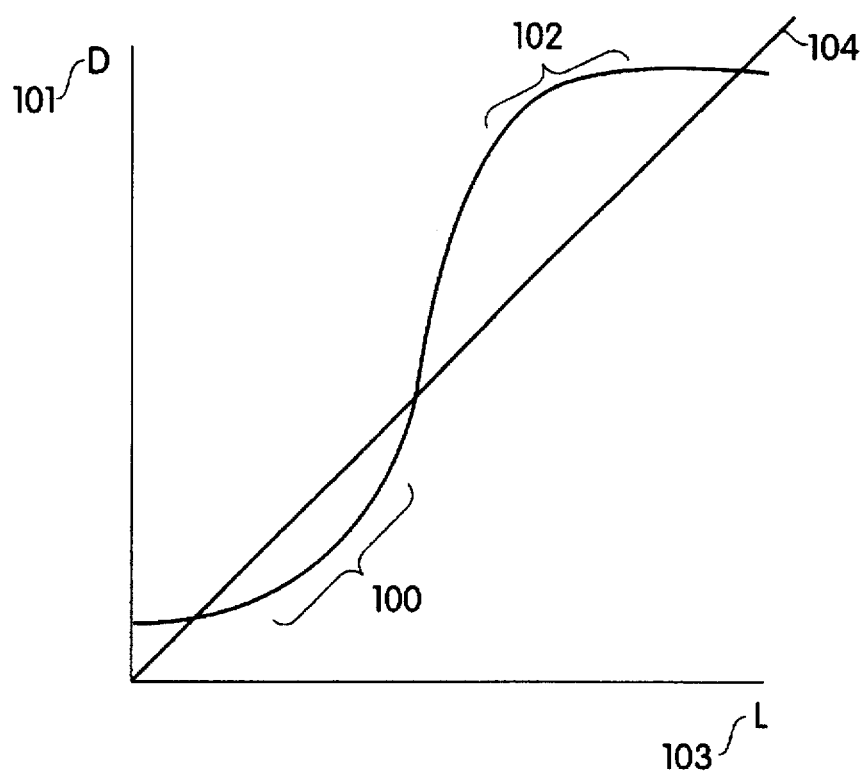
FIG. 5 is a sketch of a response curve for photographic film plotting density of pigmentation against level of illumination.

According to another aspect of the invention, the composition system can compensate for non-linearities in film response. Referring to FIG. 5, the density of pigmentation 101 of film resulting from a given exposure level 103 varies in a non-linear manner. The response curve for such a film generally includes what are known in the art as a toe portion 100 and a shoulder portion 102 in its deviation from an ideal response 104. Curves for specific film types are usually available from motion picture film manufacturers.

Figure 6:
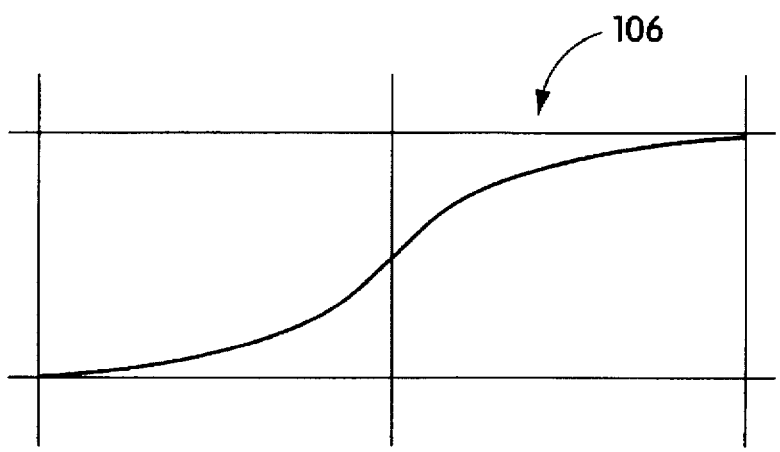
FIG. 6 is a schematic diagram of a transition using the film of FIG. 5.

In the generation of a transition, the ends of the scene to be used in the transition are generally printed by exposing them to linearly increasing levels of light. Because the film responds to light in a non-linear way, the resulting transition 106 will also be non-linear, as illustrated in FIG. 6. These transitions start out with a low rate of change from the first scene to the second scene. The rate of change then increases, and finally tapers off towards the end of the transition. This effect is generally absent in electronically-generated video transitions.

The non-linear transition characteristics of film, however, can be more pleasing to the eye. Furthermore, it is often advantageous to perform the bulk of the editing of a piece using a computerized composition system and then transfer the edits to a final film copy. It is therefore useful to provide transitions in the composition system that will simulate the ultimate effect on film.

Referring to FIGS. 1 and 2, the storage 18 of the composition system 10 may hold a series of response curve data tables for various types of film. When using the system, the user may select one of these tables for a desired film type to adjust the parameters of the transition to be played back on the display interface 30. The system then retrieves values from the selected table and determines from them the relative intensities for concurrently displaying frames from the first and second scenes during the transition. For example, in the beginning of the transition of FIG. 6, frames from the first scene will be displayed more brightly relative to the first scene than they would in a linear transition. This is because the intensity of the first frames of the first scene are being affected by the table values corresponding to the shoulder portion 102 of the selected film's response, and the intensity of the first frames of the second scene are being affected by the table values corresponding to the toe portion 100 (see FIG. 5).

A system according to the invention may also permit motion in the transition display windows. This allows editors to define these points in a dynamic fashion. For example, certain moving scenes are easier to edit while the editor is perceiving the tempo of the scene. In an embodiment permitting these types of dynamic transition editing functions, further buttons may be provided on the button bars, such as buttons having play, fast forward, rewind, jog and shuttle functions. It is noted that the four transition display windows need not display the first and last frames of the transition, but instead may display the frames immediately preceding and immediately following the transition.

The system according to the invention also permits versatile editing operations on the soundtrack of motion picture material. Although this type of transition only affects audio information, it can be specified easily using the transition display windows. For example, the user might want to create the effect of a door opening with a train outside of the door.

With the system of the invention, the user may create this effect by defining a transition on one or more of the audio tracks of the material from background room sounds to train noise. This transition may be defined to start at the first frame in which the door starts to open, which is easily found using the transition display windows.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for editing a composition including a plurality of motion picture scenes, wherein a first individual one of the motion picture scenes and a second individual one of the motion picture scenes are separated by a plurality of frames, the method comprising:

simultaneously displaying four frames in separate display areas, the four frames including corresponding frames from two of the scenes at the end of the first scene and corresponding frames from two of the scenes at the beginning of the second scene, responding to a move command, and altering, in response to the move command, the position in their respective scenes from which two of the four frames are displayed in the step of simultaneously displaying to redefine the composition.

2. The method of claim 1 wherein the plurality of frames is made up of a first series of frames of decreasing intensity from the first scene and a second series of frames of increasing intensity from the second scene, wherein frames from the first series and second series are displayed at the same time to form a dissolve scene, and wherein the step of altering alters the length of the dissolve.

3. The method of claim 1 wherein the step of responding to a move command is relative to a selected one of the four of the frames, and the step of altering alters the position of the selected one of the four frames in its scene to redefine the composition.

4. The method of claim 1 wherein the method further includes the step of dynamically displaying one of the scenes in one of the display areas and wherein the step of responding to a move command includes responding to a command during the step of dynamically displaying.

5. The media composing system of claim 1 wherein the step of altering affects only audio information associated with the first and second scenes.

6. The media composing system of claim 1 wherein the step of simultaneously displaying displays the four frames without dimming any of the four frames.

7. A media editing system for editing a composition including a first individual motion picture scene and a second individual motion picture scene separated by a plurality of frames, comprising:

storage for the first and second scenes and the plurality of frames, a user input device, four separate display areas, a display module responsive to the storage and the user input device, to retrieve and simultaneously display in the separate display areas four frames, the four frames including corresponding frames from two of the scenes at the end of the first scene and corresponding frames from two of the scenes at the beginning of the second scene, and means for altering, in response to a move command, the position in their respective scenes from which two of the four frames are displayed to redefine the composition.

8. The media composing system of claim 7 wherein the user input device includes a pointing device.

9. The media composing system of claim 7 wherein the display module includes means capable of affecting only audio information associated with the first and second scenes.

10. The media composing system of claim 7 wherein the display module is for simultaneously displaying the four frames without dimming any of the four frames.

11. The media composing system of claim 7 wherein:

the display module includes means to define a dissolve between the first and second scenes, and the user input device includes a pointing device.

12. The media composer of claim 7 wherein the means for altering is responsive to a first center positioning command to define the position of the center of the plurality of frames relative to the first scene, a second center positioning command to define the center of the plurality of frames relative to the second scene, a beginning command to define the beginning of the plurality of frames, and an end command to define the end of the plurality of frames.

13. The media composer of claim 7 wherein the means for responding to a move command includes means for responding to a command from a plurality of button bars surrounding the separate display areas.

14. The media composer of claim 7 wherein the display module is operative to display the plurality of frames made up of a first series of frames of decreasing intensity from the first scene and a second series of frames of increasing intensity from the second scene, wherein frames from the first series and second series are displayed at the same time to form a dissolve scene, and wherein the means for altering is for altering the length of the dissolve.

* * * * *